(12) United States Patent
Ghannam et al.

(10) Patent No.: US 8,044,784 B2
(45) Date of Patent: Oct. 25, 2011

(54) SUN PROTECTION SYSTEM FOR AUTOMOTIVE VEHICLE

(75) Inventors: Mahmoud Y. Ghannam, Canton, MI (US); Howard E. Churchwell, Monroe, MI (US); Todd N. Clark, Dearborn, MI (US); John W. Jensen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/047,074

(22) Filed: Mar. 14, 2011

(65) Prior Publication Data

US 2011/0163866 A1 Jul. 7, 2011

(51) Int. Cl.
*B60Q 1/00* (2006.01)
*G02F 1/15* (2006.01)
*G02B 23/16* (2006.01)

(52) U.S. Cl. ........ 340/449; 340/438; 340/425.5; 340/517; 340/522; 340/667; 340/555; 340/588; 340/601; 340/815.41; 340/600; 340/539.28; 359/265; 359/275; 359/601; 349/16

(58) Field of Classification Search ............ 340/449, 340/425.5, 539.28; 359/265, 601; 349/16
See application file for complete search history.

(56) References Cited

U.S. PATENT DOCUMENTS

| | | | | |
|---|---|---|---|---|
| 5,530,572 A * | 6/1996 | He | | 349/116 |
| 5,638,202 A | 6/1997 | Rofe | | |
| 6,671,008 B1 * | 12/2003 | Li et al. | | 349/16 |
| 6,811,201 B2 * | 11/2004 | Naik | | 296/97.2 |
| 6,819,367 B1 * | 11/2004 | Cava | | 349/16 |
| 2003/0210355 A1 * | 11/2003 | Dao | | 349/16 |
| 2009/0027759 A1 * | 1/2009 | Albahri | | 359/277 |
| 2010/0020170 A1 | 1/2010 | Higgins-Luthman et al. | | |

FOREIGN PATENT DOCUMENTS

| | | |
|---|---|---|
| DE | 10057795 A1 | 5/2002 |
| DE | 10253507 A1 | 5/2004 |
| DE | 102005007427 A1 | 8/2006 |
| DE | 102005015960 A1 | 10/2006 |
| EP | 2003005 A2 | 12/2008 |

* cited by examiner

*Primary Examiner* — Donnie Crosland
(74) *Attorney, Agent, or Firm* — Gregory P. Brown; MacMillan, Sobanski & Todd, LLC

(57) ABSTRACT

A sun protection system for a transportation vehicle has plurality of LCD zones laminated into one or more glazings of the vehicle. An occupant sensor detects an expanse of at least one occupant in the vehicle. A navigation system determines a vehicle location, a date and time value, and a heading. External and internal temperature sensors sense outside and inside temperatures. A controller generates respective drive signals for the respective LCD zones in a manual mode and in an automatic mode. The controller compares a temperature difference between the outside temperature and the inside temperature to a temperature threshold. The respective drive signals provide substantially zero attenuation if the temperature difference is less than the temperature threshold while in the automatic mode.

18 Claims, 6 Drawing Sheets

US 8,044,784 B2

SUN PROTECTION SYSTEM FOR AUTOMOTIVE VEHICLE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to sun protection for the passenger compartment of motor vehicles, and, more specifically, to LCD dimming screens incorporated into the glazings of a motor vehicle.

The shining of direct sunlight into the passenger compartment of a transportation vehicle through any of its window glazings can give rise to the separate problems of glare and heat. The glare reduces the driver's visibility and can be a distraction to the driver and any passengers. Heating of the passenger compartment can result in an increased use of the vehicle air conditioning system which results in increased fuel consumption in an internal combustion vehicle and increased charge depletion for an electric vehicle.

In prior attempts to reduce problems from direct sunlight, tinted glass has been used in the glazings. Tinting is an incomplete solution because it cannot be placed in all areas of the glazings and because the locations of tinting may not correspond to the actual direction of direct sunlight to the driver's eyes at any particular time. Furthermore, tinting reduces visibility when it is dark. On the other hand, with a very bright sun in hot conditions the amount of tinting normally applied may be inadequate to block sufficient sunlight. Furthermore, tinting is not adaptable to current conditions. For example, tinting keeps out sunlight that would provide beneficial heating of the passenger compartment on a cold day. In that instance, the heating that could have been obtained using solar energy for free instead has to be made up for by a heater powered by the vehicle using its energy source (gasoline or battery charge).

Another conventional solution to the heat and glare of direct sunlight has been the use of blocking shades or other mechanical means to selectively deploy over certain window glazings to block to the sunlight. One typical blocking shade is the sun visor usually attached near the top of the windshield for the driver and front seat passenger. Sun visors can be distracting since the driver or passenger must continually physically move the sun visor as the vehicle changes direction. Furthermore, sun visors may be deployed in the same area where an air bag deploys during a crash (e.g., a side curtain airbag), resulting in interference with the air bag deployment. The presence of temporary shades such as a baby shade which attaches by suction cups to a window may also be undesirable during crash events.

Currently known systems let in too much sunlight when and where it is not needed and they otherwise block sunlight when it could be useful. Thus, it would be desirable to better control the blocking or attenuation of direct sunlight in order to reduce the load on climate control systems to compensate for the sunlight to thereby improve fuel economy and to improve driver vision with less glare thereby increasing overall safety.

SUMMARY OF THE INVENTION

The present invention adopts liquid crystal display technology to provide window glazings that are fully clear and can be dimmed to various levels of light attenuation by applying a corresponding electrical driving signal. By laminating the liquid crystal structures on respective portions of the glazings, a plurality of liquid crystal zones are deployed and individually controlled in a manner that optimizes both visibility and heat flow. Automatic control is integrated with manual control to improve driver visibility and reduce fuel consumption while minimizing the amount of attention that must be paid by the driver to the selection of zones for dimming In one aspect of the invention, a sun protection system is provided for a transportation vehicle. A plurality of liquid crystal zones are laminated into one or more glazings of the vehicle, wherein each liquid crystal zone attenuates light transmission in proportion to a respective drive signal applied across the respective liquid crystal zone. An occupant sensor detects an expanse of at least one occupant in the vehicle. A navigation system determines a vehicle location, a date and time value, and a heading. An external temperature sensor senses an outside temperature. An internal temperature sensor senses an inside temperature. A controller generates the respective drive signals for the respective liquid crystal zones in a manual mode and in an automatic mode. The controller compares a temperature difference between the outside temperature and the inside temperature to a temperature threshold. The respective drive signals provide substantially zero attenuation if the temperature difference is less than the temperature threshold while in the automatic mode.

DETAILED DESCRIPTION OF PREFERRED EMBODIMENTS

The lamination of LCD structures comprising transparent electrodes positioned on opposite sides of a liquid crystal material and laminated with an automotive windshield for selectably blocking sunlight is shown in U.S. Pat. No. 5,638, 202 to Rofe for the purpose of a heads-up display. Use of an addressable LCD-type variable transmittance element in a portion of a windshield is shown in U.S. Patent Application Publication US/2010/0020170A1. What is lacking from the art and provided by the present invention is a hybrid or integrated automatic/manual control of liquid crystal zones to provide sun protection in a manner that promotes good visibility while blocking direct sunlight falling upon passengers in the vehicle under appropriate is conditions to reduce heating while leaving direct sunlight unattenuated during conditions when heating is desirable.

Figure 1:
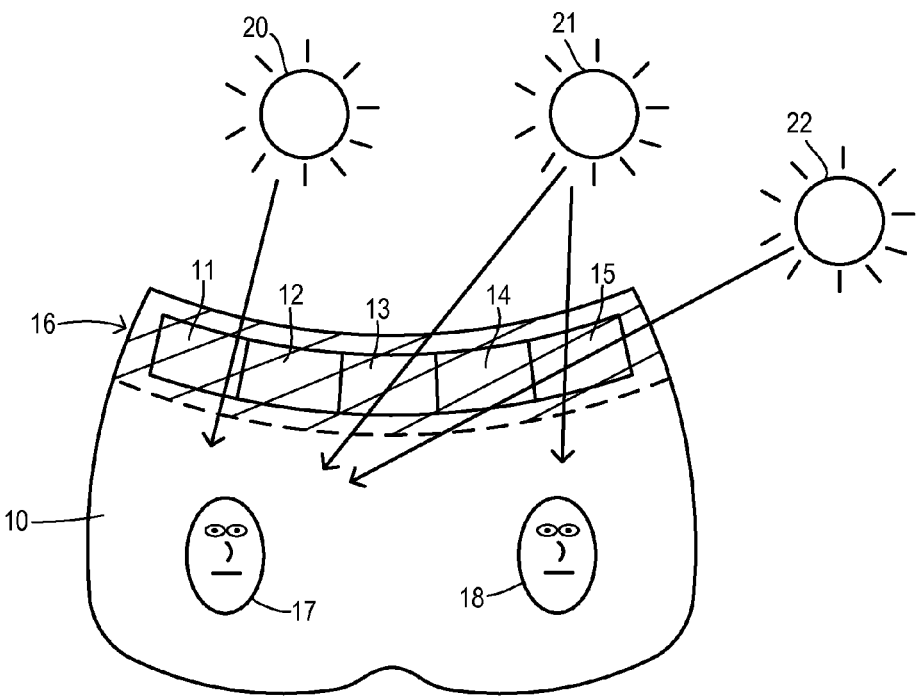
FIG. 1 is a diagram showing sun projections through LCD zones to various occupant locations.

Turning now to FIG. 1, a windshield 10 is shown with a plurality of liquid crystal zones 11-15 applied at an upper edge 16. Upper edge 16 may also be lightly tinted if desired. Tinted areas may overlap with or be separate from zones 11-15. The number of zones and their placement can take many desirable configurations according to the design and layout of a particular vehicle model. Passengers 17 and 18 (one of whom may be the driver) are seated behind windshield 10. Windshield 10 is mostly clear to ensure good visibility for driving and to comply with regulations. An adjustable sun visor function is provided by liquid crystal zones 11-15 by selectively dimming the liquid crystal zones in a manner intended to block direct sunlight that is directed toward the head of passenger 17 or 18. Thus, with the sun at a location 20, a direct sunlight path (i.e., a sun projection) extends through zone 11 to the head of passenger 17. A controller monitors the sun location and passenger location in order to calculate a direct projection from the sun to the passenger, so that zone 11 can be automatically dimmed in order to attenuate the direct sunlight that would otherwise cause glare. With the sun at a location 21, a direct sun projection from the sun to passenger 17 passes through zone 13. Also corresponding to location 21, a sun projection exists to passenger 18 through zone 15. Thus, if passengers are detected in both locations, then both zones 13 and 15 may be dimmed in order to provide sun protection for both passengers. With the sun at location 22, there may be a sun projection through zone 15 to passenger 17 while there is no sun projection through a zone to passenger 18. However, there may be a sun projection to passenger 18 through a different window glazing as discussed below.

Figure 2:
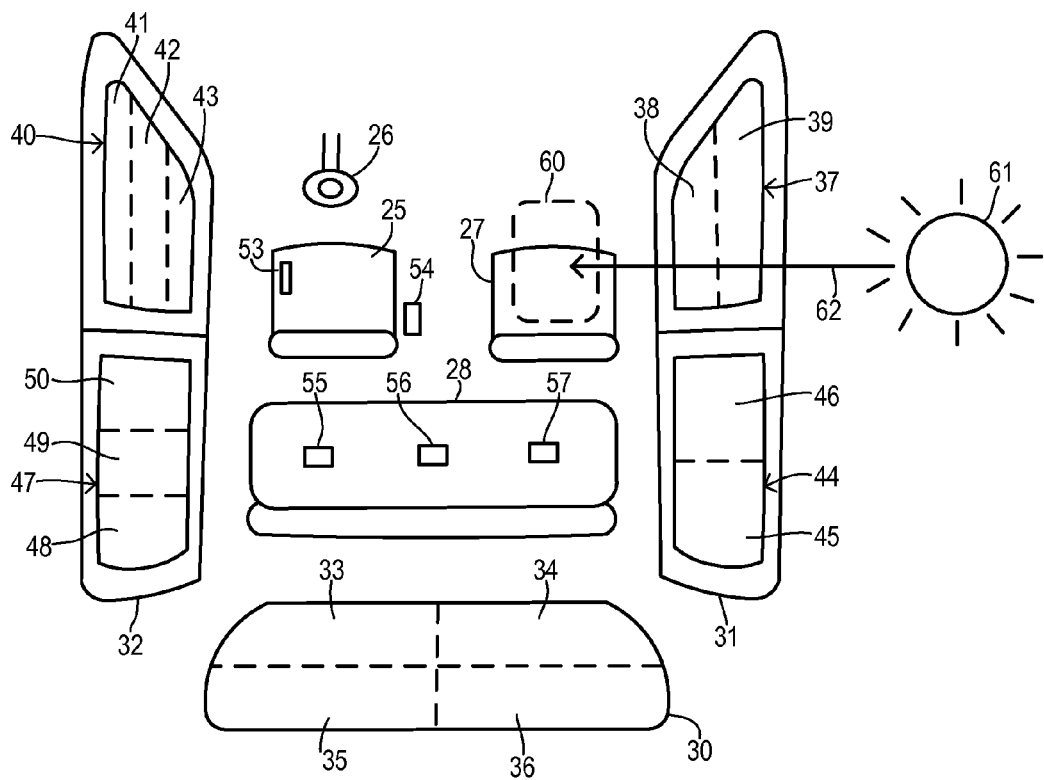
FIG. 2 is a diagram showing a vehicle layout including LCD zones in vehicle glazings surrounding occupant seating.

FIG. 2 shows interior components in the passenger compartment including a driver seat 25 behind a steering wheel 26. A passenger seat 27 and a rear bench seat 28 provide seating for additional passengers. Additional window glazings include a backlite 30, right side windows 31, and left side windows 32. The additional glazings may also include a moonroof (not shown) that may be either fixed or slidable. These windows may contain one or more additional liquid crystal zones in order to provide sun protection for various parts of the passenger compartment corresponding to various sun angles. For example, backlite 30 is divided into liquid crystal zones 33-36 each occupying a respective quadrant. The number and locations of the zones can be varied as desired. A right front window 37 is shown with an upper zone 38 and a lower zone 39. Rather than two horizontally-separated zones, a left front window 40 is shown with three horizontal zones 41-43. Rear window 44 includes two zones 45 and 46 divided vertically while a rear window 47 includes three zones 48-50 also divided vertically. The actual number of zones used in a particular vehicle would depend on a number of factors including overall size of the vehicle and a cost target for the sun protection system.

The present invention localizes the passengers in order to correctly determine when direct sunlight falls upon a passenger. Determining the presence of a passenger and their location may utilize various sensors such as a seat track position sensor 53 or a seatbelt usage sensor 54 shown for seat 25. Identical sensors are preferably deployed for each respective seat. In addition, a plurality of weight sensors 55-57 may be used to identify locations containing a passenger and possibly the size of the passenger. For each detected passenger, an estimated physical expanse 60 is determined based on variables such as seat track position, weight, and other convention object detection signals. Based on a sun location 61 and a passenger expanse 60, a sun projection path 62 can be compared with the location of various liquid crystal zones to determine which should be driven by a respective drive signal to proportionally attenuate light passing through a zone in order to reduce direct sunlight falling on the passenger expanse 60.

Figure 3:
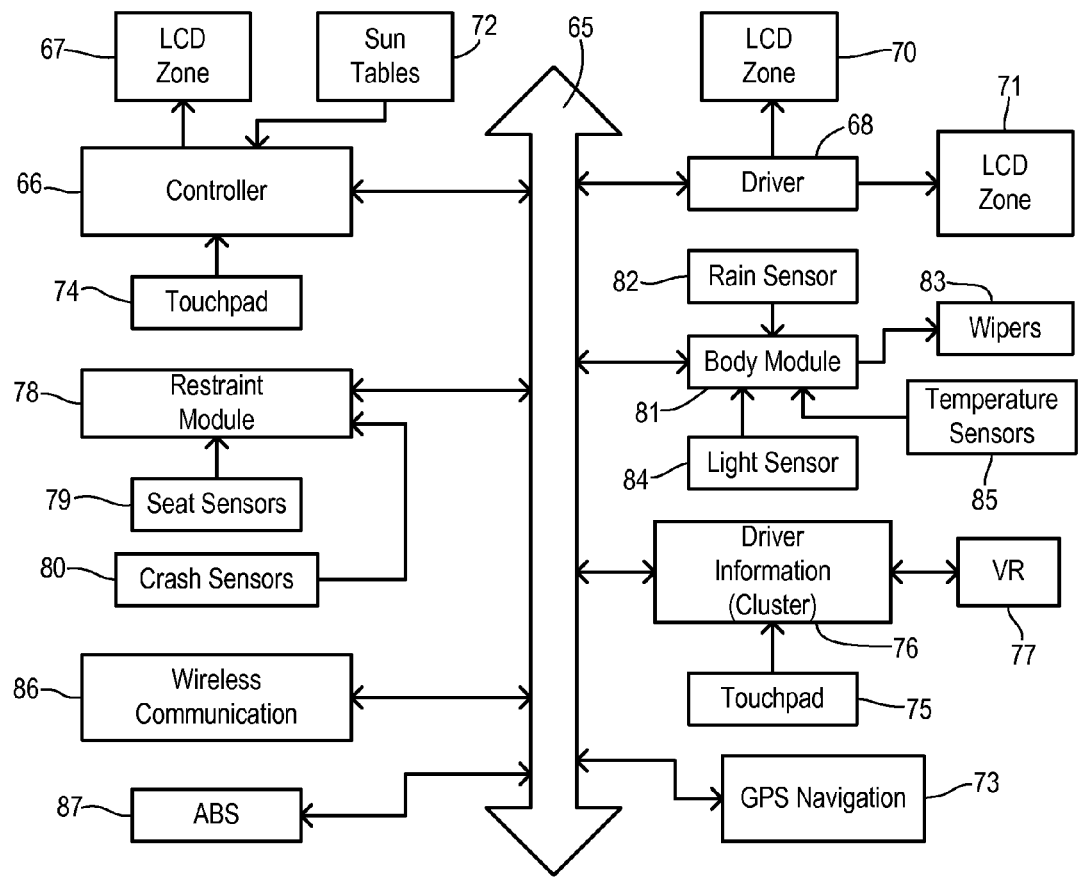
FIG. 3 is an electrical block diagram showing vehicle systems interconnected by a high speed communication bus.

FIG. 3 shows a hardware block diagram according to a first embodiment of the invention. A high-speed serial bus network 65 is preferably used to provide intercommunication between various components of the invention. It may be comprised of a CAN bus or other multiplex network. A sun protection controller 66 is coupled to bus 65 for determining the magnitude of respective drive signals for is various LCD zones in order to provide an appropriate amount of light attenuation through each zone. Controller 66 is directly connected to an LCD zone 67. Controller 66 also communicates with a driver 68 via bus 65, wherein driver 68 is connected to LCD zones 70 and 71 for selectably driving the zones to attenuate light transmission proportional to the respective drive signal from driver 68. Sine the various zones are distributed throughout the passenger compartment, separate drivers deployed throughout the vehicle with each one nearby a respective glazing provides a convenient manner for implementing the sun protection function. It will be understood that all zones could be driven by drivers separate from controller 66 or all could be driven directly by controller 66.

Sun tables 72 are coupled to or contained within controller 66 to allow a sun location to be determined based on the time and date, the geographic location of the vehicle, and the vehicle heading. An accurate date and time of day and an accurate vehicle location and heading may preferably be obtained by controller 66 from a GPS navigation system 73 which is also coupled to bus 65. Preferably, GPS navigation system 73 includes an inertial navigation function to maintain an accurate vehicle location and heading even when GPS signals are unavailable. As used herein, vehicle location includes both geographic coordinates such as latitude and longitude as well as a vehicle heading measured as a compass direction toward which the front of the vehicle is pointed.

For providing manual control of the dimming of various zones, a touchpad 74 is coupled to controller 66. Alternatively, a separate, multi-system touchpad 75 can be used to provide manual control signals. Touchpad 75 is coupled to a driver information module 76, such as the type used to display information on a vehicle cluster and collect driver commands for climate control settings and the like. Driver information module 76 may alternatively include a voice recognition system 77 to allow a driver to issue voice commands as is known in the art.

In order to identify passenger locations and expanses, controller 66 communicates with a restraint module 78 that keeps track of passenger information as part of its job to control crash restraint devices such as airbags. A plurality of seat sensors 79 and crash sensors 80 are connected to restraint module 78 in a conventional manner.

In a preferred embodiment, the present invention also identifies current weather conditions to determine whether there is greater than a predetermined likelihood of there being sunny conditions. For example, a body module 81 is coupled to a rain sensor 82, a windshield wiper system 83, and an ambient light sensor 84 via bus 65. If rain sensor 82 detects a certain amount of moisture on the windshield, then controller 66 is notified, and it concludes that there is less than a predetermined likelihood of sunny conditions so it deactivates any automatic dimming Likewise, if windshield wipers 83 are on then it can be concluded that sunny conditions are absent. Likewise, light sensor 84 measures the ambient light and when the ambient light is below a predetermined level, controller 66 concludes that the likelihood of sunny conditions are low.

Body module 81 is further connected to temperature sensors 85 which generate temperature measurements for the outside temperature and the inside temperature. The temperature measurements are communicated to controller 66 for use in determining whether there should be any automatic dimming of the liquid crystal zones. Alternatively, temperature sensors could be connected directly to controller 66 or could be connected to other modules in a vehicle which are also interconnected with bus 65.

A wireless communication module 86 coupled to bus 65 may communicate with a remote weather service to help evaluate the likelihood of sunny conditions. Wireless communication module 86 may preferably include a cellular data service or the like for accessing weather information via the Internet, for example. Information from a weather service may also include outside temperature information to help identify when conditions exist such that heat from direct sunlight is potentially beneficial for assisting to heat the passenger compartment on a cold day.

The present invention may include an automatic dimming deactivation feature that acts in response to emergency conditions. Thus, controller 66 may receive signals from crash sensors and/or from an anti-lock brake system 87 via bus 65. These are used to generate an emergency signal during heavy braking, which may indicate that the driver needs maximum visibility to react to an emergency situation.

Figure 4:
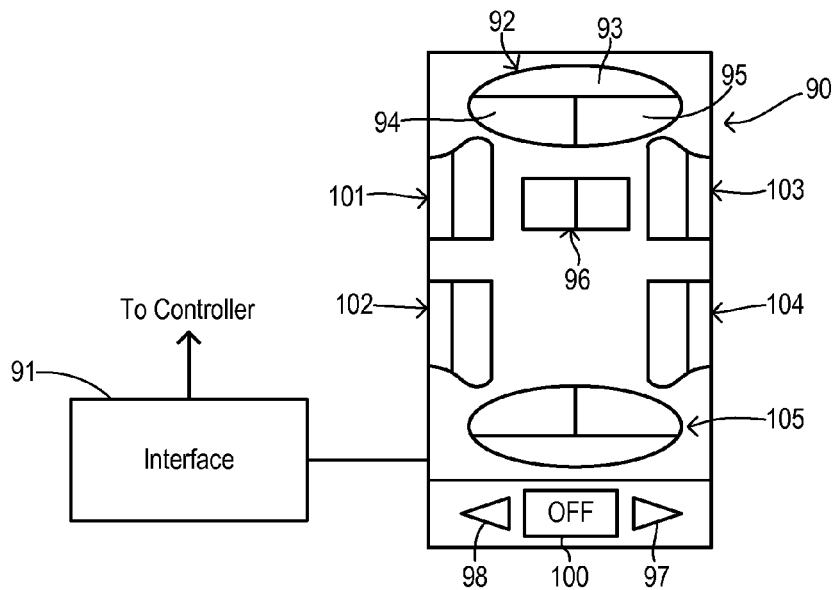
FIG. 4 is shows a touchpad for manual control of LCD zones.

For providing driver control of dimming in a manual mode of the sun protection system, a touchpad or touch screen 90 shown in FIG. 4 may be connected to the controller via an interface 91. Conventional touchpad technology may be employed, including a laminated touchpad applied to one of the window glazings such as the windshield where it may be placed in convenient reach of the driver. Touchpad 90 provides a graphic representation of each liquid crystal zone on the various glazings together with controls for setting the desired attenuation for each zone and for possible deactivation of the automatic mode entirely. Thus, an icon 92 representing the windshield may include an upper zone 93, a lower left zone 94, and a lower right zone 95. By touching each represented zone, the user may alternately turn on or off the dimming function for that zone and may increase or decrease the attenuation for a selected zone using an increase button 97 and a decrease button 98, respectively. An off button 100 is provided for providing a manual signal that deactivates the automatic function as described below.

An icon 96 represents a moonroof having two separate dimming zones. An icon 101 represents the driver side front window and has upper and lower zone areas that may be activated by the user's finger. Likewise, a driver side rear window icon 102 and passenger side icons 103 and 104 have areas for controlling upper and lower dimming zones. A backlite icon 105 includes three zone areas for an upper dimming zone and lower left and right dimming zones. Touchpad 90 may preferably include backlighting or other means for highlighting each individual active area to provide feedback while the user selects and modifies them.

Figure 5:
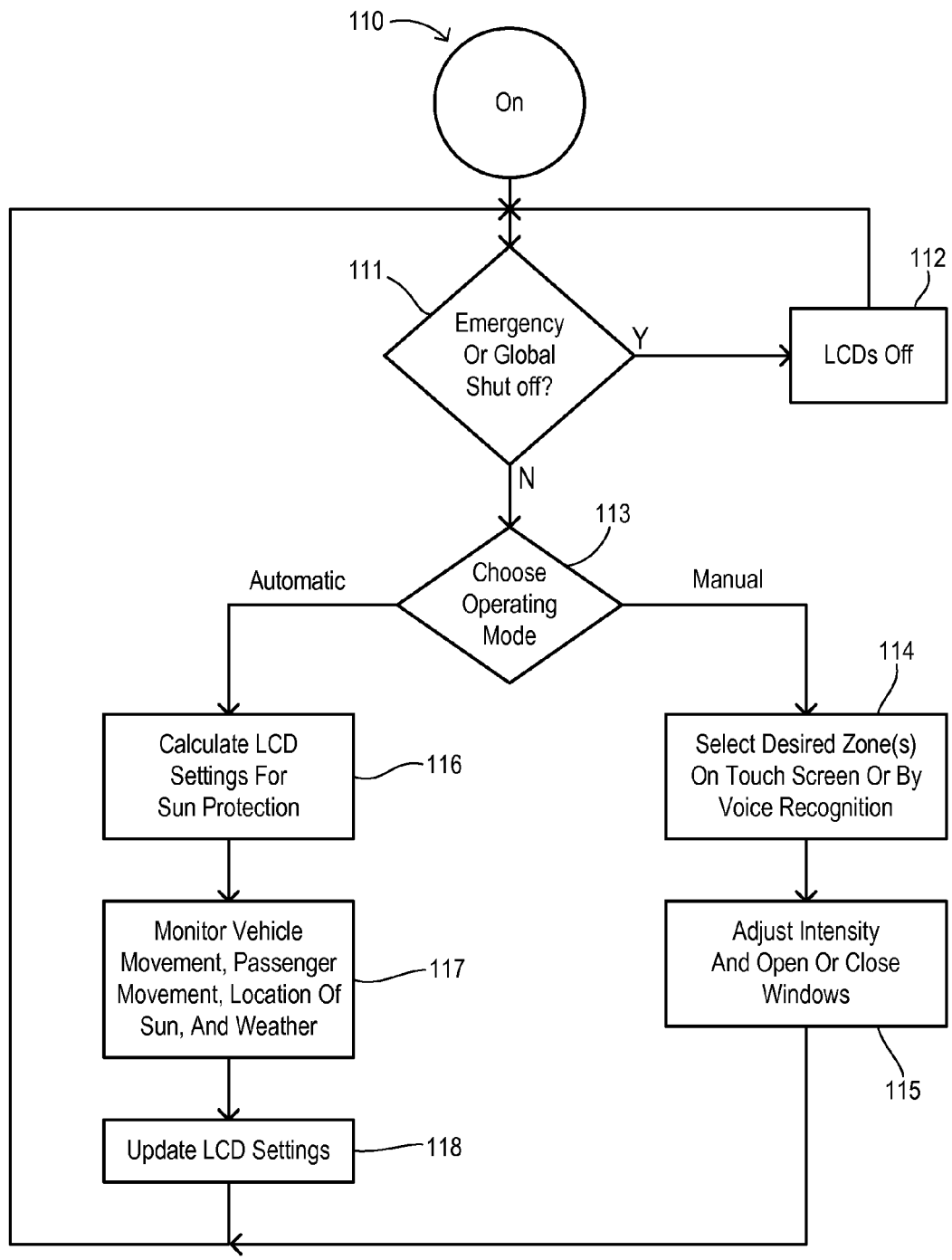
FIG. 5 is a flowchart of one embodiment of a general method for controlling sun protection in both automatic and manual modes.

A first embodiment of an overall method of the invention is shown in FIG. 5. After the sun protection system is activated at step 110 (e.g., after starting of the vehicle) a check is made in step 111 to determine whether an emergency or global shutoff command has been issued. Such a command based on an emergency signal from monitors within the vehicle preferably corresponds to a braking or potential crash situation as may be determined by the braking system or by a remote object collision detection system (not shown), respectively. A global shutoff command could be issued by a law enforcement officer over a wireless link to prevent window dimming during a traffic stop, for example. If such a command is in effect, then the LCD zones are turned off (i.e., are driven at a level to provide substantially zero attenuation) in step 112.

If there is no global shutoff, then a check is made in step 113 to determine whether an automatic mode or a manual mode is active. The manual mode may be activated when the user manipulates a touch screen button to deactivate the automatic mode, for example. While in the manual mode, the user selects desired zones on the touch screen or by voice recognition in step 114. For each selected zone, the user adjusts the dimming intensity in step 115. In addition, manual controls (not shown) may be provided for opening or closing any openable windows (especially the side windows or moonroof) so that the desired dimming can be appropriately initiated. While in manual mode, a return is made to step 111 for continually monitoring for the onset of an emergency or global shutoff command.

When the automatic mode is chosen in step 113, then the sun protection system calculates LCD zone settings for appropriate sun protection in step 116. In step 117, the system monitors for vehicle movement, passenger movement, corresponding movement of the location of the sun, and changes to the weather conditions. Based on the monitored changes, the LCD zone settings are updated in step 118, and a return is made to step 111 to check for emergency or global shutoff commands.

Figure 6:
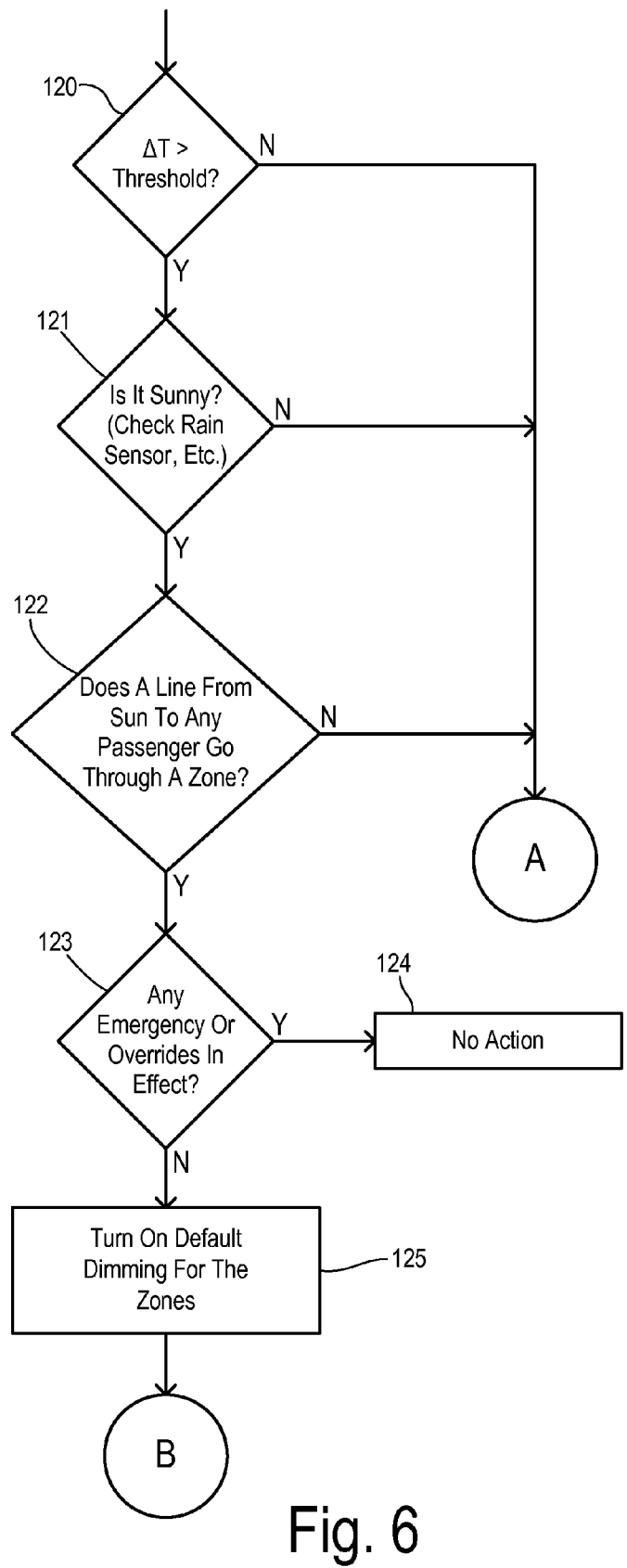
FIGS. 6-8 are a flowchart showing an embodiment of a method of the invention in greater detail.
Figure 7:
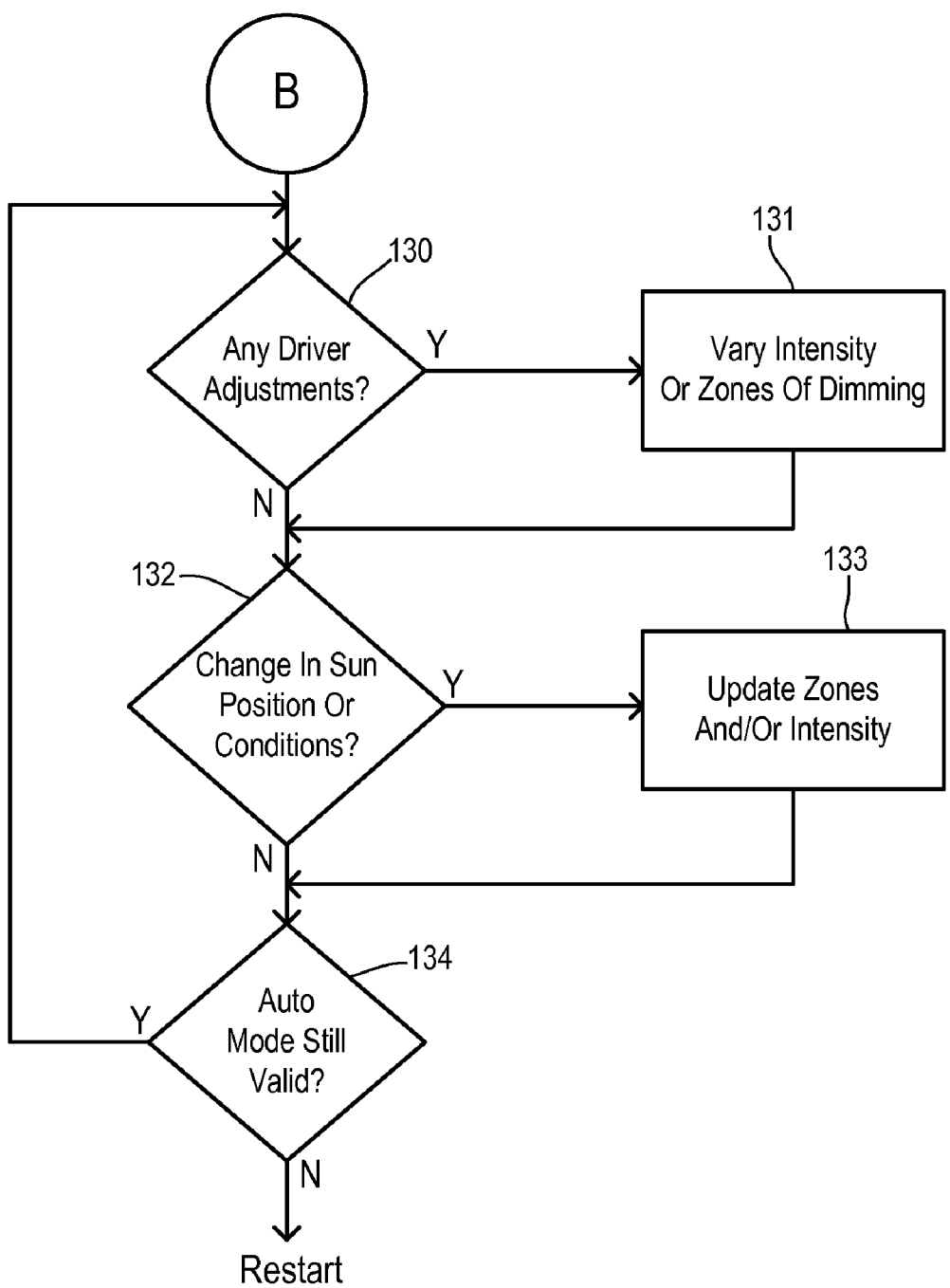
Figure 8:
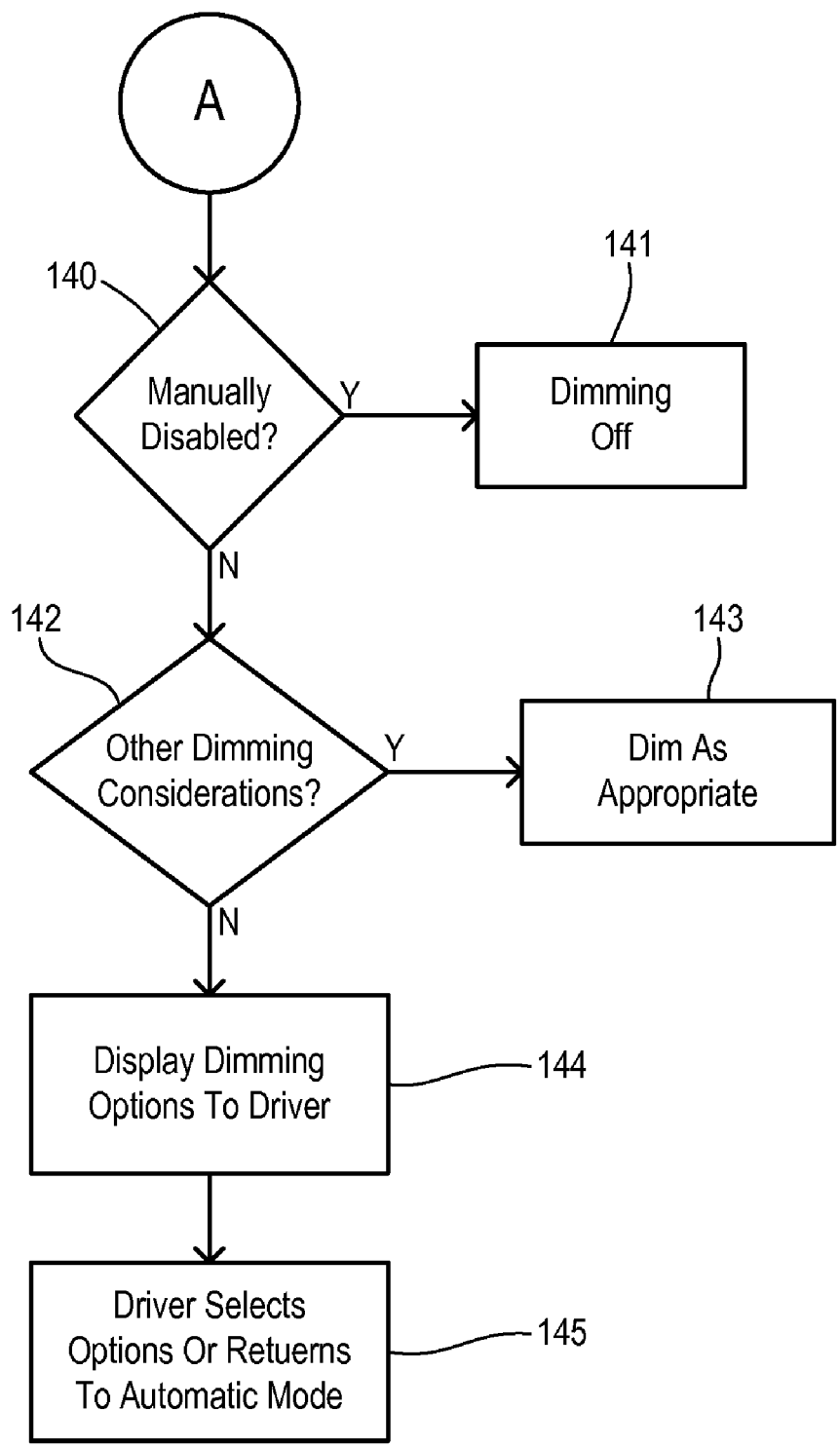

An alternative method of the invention is shown in FIGS. 6-8 wherein the automatic and manual modes are integrated. In step 120 of FIG. 6, a check is made to determine whether the difference between the inside temperature and outside temperature is greater than a predetermined threshold. When the inside and outside temperatures are approximately equal (i.e., the temperature difference is less than the threshold), then it is inferred that heat transfer into the vehicle by direct sunlight should be allowed. When the inside and outside temperatures are about the same, then the presence of any direct sunlight is not creating a large heat transfer. This usually would usually coincide with early morning or cold conditions when heat transfer into the vehicle would be beneficial. Therefore, automatic dimming would not be automatically engaged (drive signals to the LCD zones set to zero) and the method continues to a point A in FIG. 8.

If the temperature difference is greater than the threshold, then a check is made in step 121 to determine whether there is a predetermined likelihood of sunny conditions. If a check of the rain sensor, weather service, or other means determines that there is less than a predetermined likelihood of sunny conditions, then the drive signals to the liquid crystal zones are set to provide substantially zero attenuation for the automatic mode and the method continues to point A.

If the chance of sunny conditions is greater than the predetermined likelihood, then a check is made in step 122 to determine whether a sun projection through the respective liquid crystal zones coincides with the estimated spatial expanse of a passenger. More specifically, a sun position (sun azimuth and elevation) is determined in response to the vehicle location, a time and date value, and a heading (e.g., all received from the GPS navigation system) and a check is made to determine whether a line from the sun to any passenger goes through a liquid crystal zone. If not, then the method continues at point A. If a sun projection does coincide with the expanse of a passenger, then a check is made in step 123 to determine whether any emergency or overrides are in effect. If so, then no action is taken and the method halts at step 124.

Otherwise, default dimming is turned on for the impacted zones in step 125 and the method continues to a point B. The default dimming may be comprised of a fixed intermediate amount of attenuation, or it may be determined based on an estimated amount of clouds or sun, the time or year or season, the time of day, or other factors. The present invention may employ from a single dimming level through a large number of dimming levels, depending upon the design intent for a particular vehicle.

Point B is shown in FIG. 7 wherein the method continues to a step 130 to perform a check for any driver adjustments entered via a touchpad, voice commands, or any other type of user input. If there are user inputs, then the intensity or attenuation of dimming of respective zones are varied in step 131. For example, a side window zone may have been set to a default dimming attenuation in the automatic mode, and the driver may increase or decrease the light attenuation of the direct sunlight to a customized value. In a preferred embodiment, the automatic mode continues to function using the driver-specified attenuation for the particular zone. When the driver adjusted zone no longer includes a sun projection onto the expanse of a passenger, it may be undimmed until the sun projection reenters the zone; at which time the driver-selected value may be re-used instead of restoring a default value of attenuation.

In step 132 a check is made for changes in the sun position and/or environmental conditions including the likelihood of it being sunny. If the sun projection has changed to different zones, then the zones and/or intensity of dimming are updated in step 133.

A check is made in step 134 to determine whether the automatic mode is still valid, and if still valid then a return is made to step 130. In particular, the automatic mode may become invalid when the vehicle ignition key is shut off, a user deselects the automatic mode, or a particular length of time has expired. A maximum operation time for the automatic mode allows for the periodic recheck of all the base conditions for dimming If the automatic mode has lost validity, then a return is made to the beginning of FIG. 6 in order to restart the method.

When the conditions for enacting an automatic mode dimming shown in steps 120-122 are not present, the method proceeds to point A in FIG. 8. A check is made in step 140 to determine whether the sun protection system has been manually disabled by the driver. If so, then dimming is turned off at step 141. Otherwise, a check is made in step 142 to determine whether there are other dimming considerations or conditions in which it is desirable to automatically activate the LCD zones for dimming Such conditions may include a parked vehicle during either daylight or nighttime conditions in order to obscure the vehicle contents for enhanced security. When such considerations are present, the LCD zones may be dimmed as appropriate in step 143. In the parking situation, a maximum dimming may be selected, for example.

When no such considerations are present, then it may be desirable to prompt the driver for their desire to use the manual mode. In step 144, dimming options may be displayed to the driver in various ways. For example, the backlighting of a touch screen may be activated or synthesized voice prompts may be played through the vehicle audio system. In step 145, the driver selects any desired options or may return to automatic mode by activating particular buttons on a touch screen.

The foregoing invention provides an easily manufactured sun protection system avoiding movable mechanical structures within the passenger cabin. It optimizes heat transfer into the vehicle thereby saving energy, minimizing engine load, and reducing fuel consumption. The automatic placement of dimmed areas to improve driver visibility coupled with integrated manual adjustment and emergency override achieves increases in safety.

What is claimed is:

1. A sun protection system for a transportation vehicle comprising:
    a plurality of liquid crystal zones laminated in one or more glazings of the vehicle, wherein each liquid crystal zone attenuates light transmission in proportion to a respective drive signal applied across the respective liquid crystal zone;
    an occupant sensor for detecting an expanse of at least one occupant in the vehicle;
    a navigation system for determining a vehicle location, a date and time value, and a heading;
    an external temperature sensor for sensing an outside temperature;
    an internal temperature sensor for sensing an inside temperature; and
    a controller for generating the respective drive signals for the respective liquid crystal zones in a manual mode and in an automatic mode, wherein the is controller compares a temperature difference between the outside temperature and the inside temperature to a temperature threshold, and wherein the respective drive signals provide substantially zero attenuation if the temperature difference is less than the temperature threshold while in the automatic mode.

2. The system of claim 1 further comprising:
    a weather detector for detecting at least a predetermined likelihood of sunny conditions around the vehicle, wherein the drive signals provide substantially zero attenuation if the predetermined likelihood of sunny conditions is absent while in the automatic mode.

3. The system of claim 2 wherein the weather detector includes one or more from the group comprising a moisture sensor, a wiper system, a wireless weather service, and an ambient light sensor.

4. The system of claim 1 wherein when the temperature difference is greater than the temperature threshold, then the controller determines a sun projection in response to the vehicle location, data and time value, and heading, and the controller compares the sun projection with the expanse of the occupant, wherein a respective drive signal is set to provide a non-zero attenuation if the sun projection coincides with the expanse while in the automatic mode.

5. The system of claim 4 further comprising:
    a weather detector for detecting at least a predetermined likelihood of sunny conditions around the vehicle, wherein the drive signals provide substantially zero attenuation if the predetermined likelihood of sunny conditions is absent while in the automatic mode.

6. The system of claim 4 wherein the controller determines a sun projection in response to a solar azimuth and a solar elevation determined using the date and time value and the heading.

7. The system of claim 1 further comprising a vehicle safety system generating an emergency signal, wherein the controller sets the respective drive signals to provide a substantially zero attenuation in response to the emergency signal whether the system is in the manual mode or the automatic mode.

8. The system of claim 7 wherein the emergency signal indicates a potential crash situation and is selected from a group comprising a vehicle acceleration above a predetermined acceleration, an anti-lock brake activation, a passenger restraint activation, and an obstacle collision warning.

9. The system of claim 7 further comprising a wireless receiver, wherein the emergency signal is generated by the wireless receiver in response to a remote command broadcast to the wireless receiver.

10. The system of claim 1 further comprising:
a manual touchpad within reach of a driver of the vehicle for choosing a desired attenuation for each desired liquid crystal zone in the manual mode.

11. The system of claim 1 further comprising:
a voice response system responsive a driver of the vehicle for choosing a desired attenuation for each desired liquid crystal zone in the manual mode.

12. The system of claim 1 wherein the manual mode includes a setting for disabling the automatic mode.

13. The system of claim 1 wherein the occupant sensor is included in a crash restraint system coupled to the controller by a high speed communication bus.

14. The system of claim 1 wherein the occupant sensor includes at least one selected from the group comprising a seat load sensor, a seat track sensor, and a seat belt sensor.

15. The system of claim 1 wherein the navigation system includes a GPS receiver and an inertial monitoring system.

16. The system of claim 1 wherein the glazings include a windshield, a backlite, and a plurality of side windows.

17. A sun protection system for a transportation vehicle comprising:
a plurality of liquid crystal zones laminated in one or more glazings of the vehicle, wherein each liquid crystal zone attenuates light transmission in proportion to a respective drive signal applied across the respective liquid crystal zone;
an occupant sensor for detecting an expanse of at least one occupant in the vehicle;
a navigation system for determining a vehicle location, a date and time value, and a heading;
a weather detector for detecting at least a predetermined likelihood of sunny conditions around the vehicle;
an external temperature sensor for sensing an outside temperature;
an internal temperature sensor for sensing an inside temperature:
a controller for generating the respective drive signals for the respective liquid crystal zones in a manual mode and in an automatic mode, wherein the controller compares a temperature difference between the outside temperature and the inside temperature to a temperature threshold, wherein the respective drive signals provide substantially zero attenuation if the temperature difference is less than the temperature threshold while in the automatic mode, wherein the drive signals provide substantially zero attenuation if the predetermined likelihood of sunny conditions is absent while in the automatic mode, wherein when the temperature difference is greater than the temperature threshold then the controller determines a sun projection in response to the vehicle location, data and time value, and heading, wherein the controller compares the sun projection with the expanse of the occupant, and wherein a respective drive signal is set to provide a selected attenuation if the sun projection coincides with the expanse while in the automatic mode; and
a manual interface for manually inhibiting the automatic mode and for selecting a dimming attenuation for a selected liquid crystal zone in the manual mode.

18. The system of claim 17 wherein the controller includes a parking state wherein a plurality of liquid crystal zones are at a maximum attenuation to reduce visibility of vehicle contents from outside the vehicle.

* * * * *